(12) United States Patent
Li

(10) Patent No.: US 11,557,037 B2
(45) Date of Patent: Jan. 17, 2023

(54) SYSTEMS AND METHODS FOR SCANNING DATA PROCESSING

(71) Applicant: SHANGHAI UNITED IMAGING HEALTHCARE CO., LTD., Shanghai (CN)

(72) Inventor: Shankui Li, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 90 days.

(21) Appl. No.: 16/998,009

(22) Filed: Aug. 20, 2020

(65) Prior Publication Data

US 2020/0380677 A1 Dec. 3, 2020

(30) Foreign Application Priority Data

Aug. 20, 2019 (CN) .......................... 201910770712.4

(51) Int. Cl.
*G06T 7/00* (2017.01)
*G06T 7/20* (2017.01)
*G06T 11/00* (2006.01)

(52) U.S. Cl.
CPC .............. *G06T 7/0012* (2013.01); *G06T 7/20* (2013.01); *G06T 11/005* (2013.01); *G06T 2207/10081* (2013.01); *G06T 2211/436* (2013.01)

(58) Field of Classification Search
CPC ........ G06T 7/0012; G06T 7/20; G06T 11/005
See application file for complete search history.

(56) References Cited

U.S. PATENT DOCUMENTS

| 10,271,812 | B2 | 4/2019 | Hofmann | |
|---|---|---|---|---|
| 2007/0147577 | A1 | 6/2007 | Seto | |
| 2008/0253505 | A1* | 10/2008 | Imai | A61B 6/032 378/8 |
| 2010/0208863 | A1 | 8/2010 | Heuscher et al. | |
| 2012/0249138 | A1 | 10/2012 | Pfeuffer | |
| 2014/0119611 | A1 | 5/2014 | Prevrhal et al. | |
| 2014/0376795 | A1 | 12/2014 | Lamash et al. | |
| 2016/0110874 | A1* | 4/2016 | Matthews | G06T 7/174 382/131 |
| 2018/0365867 | A1 | 12/2018 | Yang | |
| 2019/0139275 | A1 | 5/2019 | Hao et al. | |

FOREIGN PATENT DOCUMENTS

| CN | 104331914 A | 2/2015 |
|---|---|---|
| CN | 107280698 A | 10/2017 |

* cited by examiner

*Primary Examiner* — Mishawn N. Hunter
(74) *Attorney, Agent, or Firm* — Metis IP LLC

(57) ABSTRACT

The systems and method for processing scanning data of a scanning object are provided. The method may include acquiring, in a scanning process, at least two target phases of a motion of the scanning object, wherein the scanning process involves multiple data acquisition time points each of which corresponds to a scanning data set; identifying at least two first time periods during the scanning process, each first time period corresponding to one of the two target phases; determining a second time period that encloses the at least two first time periods; and retrieving once, from the multiple scanning data sets, second scanning data sets for reconstructing phase images each of which corresponds to one target phase, the second scanning data sets being acquired at second data acquisition time points of the multiple data acquisition time points within the second time period.

20 Claims, 11 Drawing Sheets

400

Determining at least two target phases of a motion of a scanning object, the at least two target phases being within a scanning process that involves multiple data acquisition time points each of which corresponds to a scanning data set — 410

Identifying at least two first time periods during the scanning process, each of the at least two first time periods corresponding to one of the at least two target phases — 420

Determining a second time period that encloses the at least two first time periods — 430

Retrieving once, from the multiple scanning data sets, second scanning data sets for reconstructing phase images each of which corresponds to one of the at least two target phases — 440

FIG. 4

SYSTEMS AND METHODS FOR SCANNING DATA PROCESSING

CROSS-REFERENCE TO RELATED APPLICATIONS

This application claims priority to Chinese Patent Application No. 201910770712.4, filed Aug. 20, 2019, the contents of which are hereby incorporated by reference.

TECHNICAL FIELD

The present disclosure generally relates to data processing, and in particular, to systems and methods for processing scanning data.

BACKGROUND

Computed Tomography (CT) has emerged as a key imaging modality in the visualization of anatomy. A CT device typically includes a radiation source to project precisely collimated radiation beams (e.g., X-rays, gamma rays, etc.) through an object (e.g., a patient) being imaged, and a highly sensitive detector to detect the radiation beams passing through the object. The detected radiation beams can then be used for image reconstruction.

At present, prospective image reconstruction of organs and/or tissues (e.g., the heart, the lung, etc.) of an object is mostly used in multi-slice CT scans, especially with ultra-high-slice CT scans (such as 128 slices). Generally, since the prospective image reconstruction can be affected by physiological movements of the object, for example, for cardiac image reconstruction, the physiological movements caused by arrhythmia, tachycardia, etc. As a result, multiple images of different motion phases (or referred to as phase for brevity) may be reconstructed so that a doctor can select the reconstructed image with better image quality for diagnosing the object. Therefore, it is desirable to provide systems and methods for multi-phase image reconstruction to improve the efficiency in the multi-phase image reconstruction.

SUMMARY

According to a first aspect of the present disclosure, a system is provided. The system may include at least one storage device storing executable instructions for processing scanning data of a scanning object generated during a scanning process, and at least one processor in communication with the at least one storage device, wherein when executing the executable instructions, the at least one processor may configured to cause the system to perform operations. The operations may include acquiring, in a scanning process, at least two target phases of a motion of a scanning object, wherein the scanning process involves multiple data acquisition time points each of which corresponds to a scanning data set; identifying at least two first time periods during the scanning process, each of the at least two first time periods corresponding to one of the two target phases; determining a second time period that encloses the at least two first time periods; and retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

In some embodiments, to identify the at least two first time periods, the operations may include identifying a starting time point and an ending time point of a motion cycle of the motion; for each of the at least two target phases, identifying, based on the target phase, the starting time point of the motion cycle, and the ending time point of the motion cycle, a preset time point corresponding to the target phase; determining, based on the preset time point, a target data acquisition time point corresponding to the target phase; and determining, based on the target data acquisition time point, the first period corresponding to the target phase.

In some embodiments the determining, based on the preset time point, a target data acquisition time point corresponding to the target phase may include determining whether there is a data acquisition time point among the multiple data acquisition time points that coincides with the preset time point corresponding to the target phase; in response to determining that there is a data acquisition time point among the multiple data acquisition time points that coincides with the preset time point, designating the data acquisition time point as the target data acquisition time point corresponding to the target phase; in response to determining that there is no data acquisition time point among the multiple data acquisition time points that coincides with the preset time point, determining a difference between the preset time point and each of the multiple data acquisition time points; identifying, among the multiple differences, a minimum difference; and designating the data acquisition time point corresponding to the minimum difference as the target data acquisition time point corresponding to the target phase.

In some embodiments the at least two first time periods may both fall within a range within the motion cycle.

In some embodiments, the range may include a portion or all of the motion cycle.

In some embodiments, the determining, based on the target data acquisition time point, the first time period corresponding to the target phase may include determining a target data acquisition angle at the target data acquisition time point corresponding to the target phase; determining a first angle range centering at the target data acquisition angle corresponding to the target phase; and designating, as the first time period, a plurality of data acquisition time points each of which corresponds to a data acquisition angle within the first angle range.

In some embodiments, the determining a second time period that encloses the at least two first time periods may include identifying a starting time point and an ending time point for each of the at least two first time periods; designating an earlier starting time point of the at least two starting time points of the at least two first time periods as a starting time point of the second time period; and designating a later ending time point of the at least two ending time points of the at least two first time periods as an ending time point of the second time period.

In some embodiments, the reconstructing phase images each of which corresponds to one of the at least two target phases may include pre-processing once the second scanning data sets; and generating, based on the pre-processed second scanning data sets, the phase images.

In some embodiments, the generating, based on the pre-processed second scanning data sets, the phase images may include for each of the at least two target phases, identifying, from the pre-processed second scanning data sets, pre-processed second scanning data sets of the target phase; and reconstructing, based on the pre-processed second scanning data sets corresponding to the target phase, a phase image of the target phase.

In some embodiments, each of the pre-processed second scanning data sets of the target phase may correspond to a data acquisition angle, and the data acquisition angles of the pre-processed second scanning data sets of the target phase may be with a first angle range corresponding to the target phase.

According to another aspect of the present disclosure, a method for processing scanning data may include one or more of the following operations. The method may include acquiring, in a scanning process, at least two target phases of a motion of a scanning object, wherein the scanning process involves multiple data acquisition time points each of which corresponds to a scanning data set; identifying at least two first time periods during the scanning process, each of the at least two first time periods corresponding to one of the two target phases; determining a second time period that encloses the at least two first time periods; and retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

According to yet another aspect of the present disclosure, a non-transitory computer readable medium is provided. The non-transitory computer readable medium may comprise at least one set of instructions for scanning data processing, wherein when executed by one or more processors of a computing device, the at least one set of instructions may cause the computing device to perform a method. The method may include acquiring, in a scanning process, at least two target phases of a motion of a scanning object, wherein the scanning process involves multiple data acquisition time points each of which corresponds to a scanning data set; identifying at least two first time periods during the scanning process, each of the at least two first time periods corresponding to one of the two target phases; determining a second time period that encloses the at least two first time periods; and retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a flowchart illustrating an exemplary process for processing scanning data of a scanning object during a scanning process according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, sections, or assembly of different levels in ascending order. However, the terms may be displaced by another expression if they achieve the same purpose.

Figure 3:
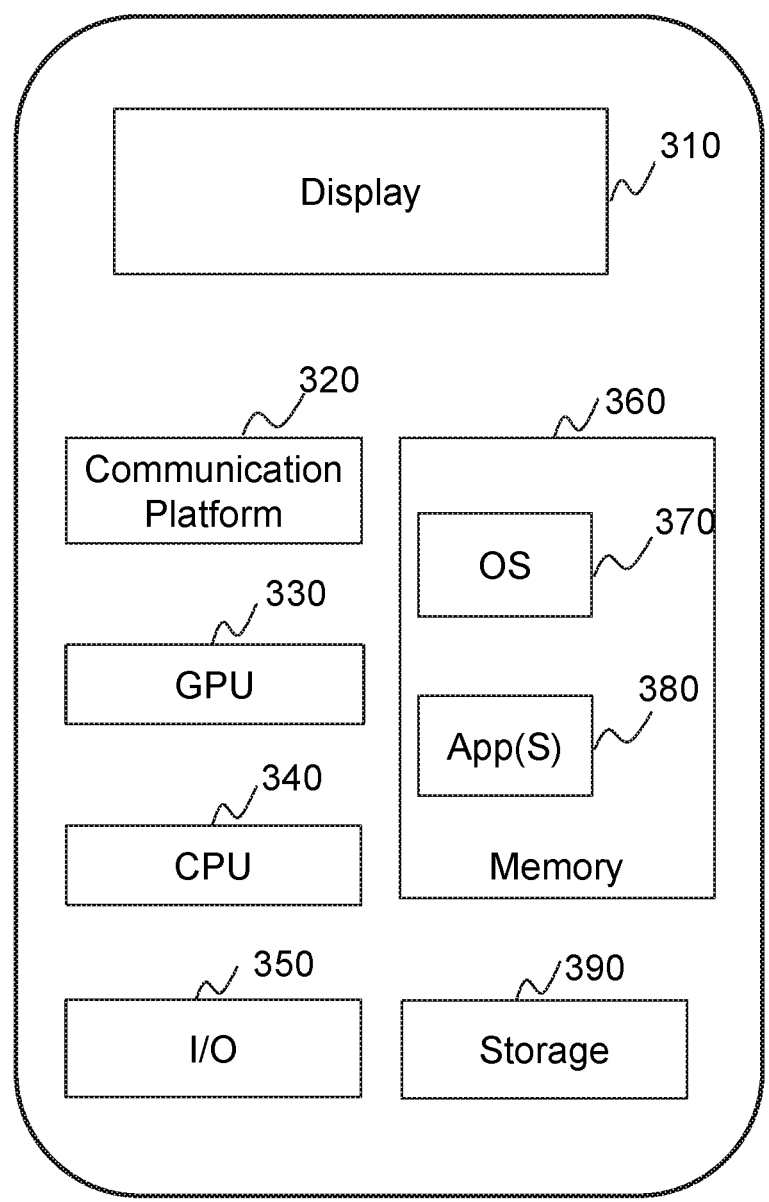
FIG. 3 is a schematic diagram illustrating exemplary hardware components and/or software components of an exemplary mobile device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The present disclosure provides mechanisms (which can include methods, systems, a computer-readable medium, etc.) for processing scanning data of a scanning object generated during a scanning process. The method may include acquiring, in the scanning process, at least two target phases of a motion of a scanning object, wherein the scanning process involves multiple data acquisition time points each of which corresponds to a scanning data set. The method may further include identifying at least two first time periods during the scanning process, each of the at least two first time periods corresponding to one of the two target phases. The method may further include determining a second time period that encloses the at least two first time periods. The method may further include retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

Figure 10:
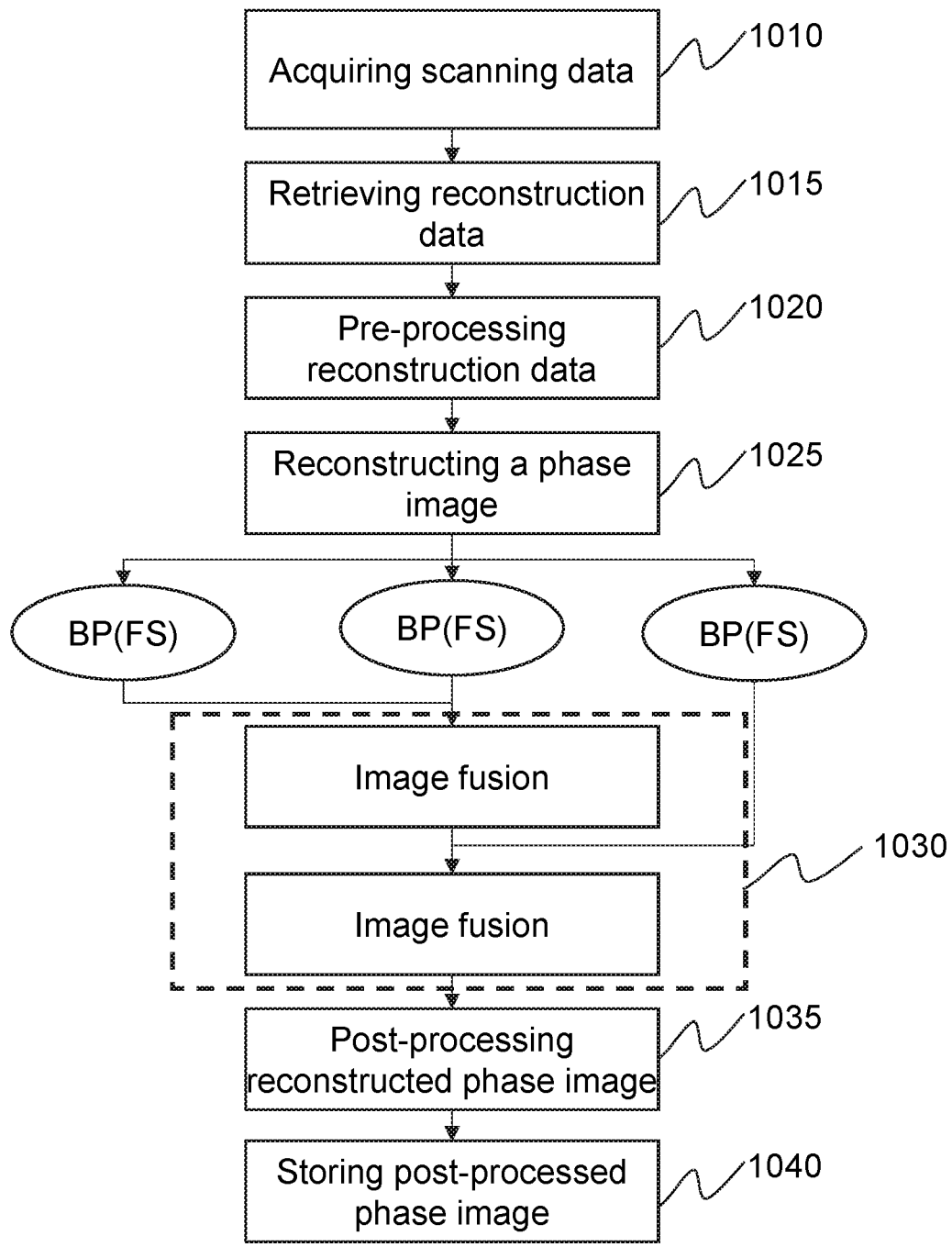
FIG. 10 is a flowchart illustrating an exemplary single-phase image reconstruction mode according to some embodiments of the present disclosure.

Generally, a single-phase image reconstruction mode (e.g., image reconstruction of CT scan) may include selection of reconstruction data (or scanning data), retrieving of reconstruction data, pre-processing of reconstruction data, image reconstruction, image fusion, post-processing of reconstructed images, etc., as illustrated in FIG. 10. In some embodiments, since an image reconstruction process may be affected by many factors, it is desired to reconstruct images of multiple phases (or referred to as phase images) so that a user (e.g., a doctor) can select better quality images for disease diagnosis. When images of multiple phases are to be reconstructed, some scanning data may correspond to more than one phase that overlap. If the single-phase reconstruction mode is adopted, a series of processes, such as scanning data retrieval, preprocessing, post-processing, and reconstruction of reconstruction data need to be performed for each phase. At least a portion of the operations constitutes duplicate efforts with respect to scanning data corresponding to overlapping phases. Therefore, by retrieving and/or pre-processing image data corresponding to multiple target phases together, repeated data retrieval and/or pre-precoessing can be avoided, thereby reducing the amount of computation resources, and improving the efficiency of the process for reconstructing images of multiple phases and overall system performance.

Figure 1:
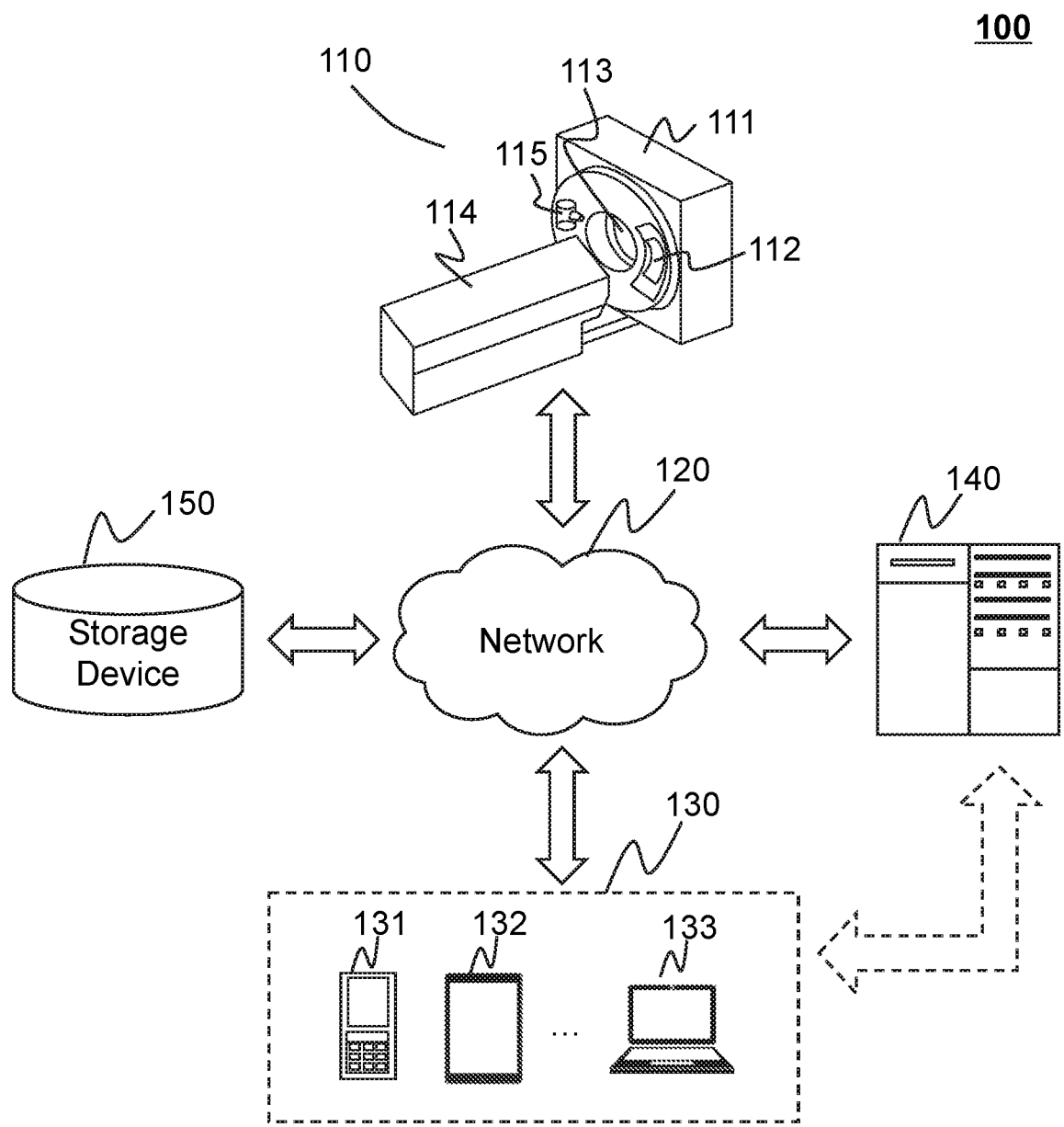
FIG. 1 is a schematic diagram illustrating an exemplary data processing system according to some embodiments of the present disclosure.

FIG. 1 is a schematic diagram illustrating an exemplary data processing system according to some embodiments of the present disclosure.

As shown in FIG. 1, the data processing system 100 may include a scanning device 110, a network 120, a terminal device 130, a processing device 140, and a storage device 150. In some embodiments, two or more components of the data processing system 100 may be connected to and/or communicate with each other via a wireless connection (e.g., the network 120), a wired connection, or a combination thereof. The components of the data processing system 100 may be connected in various ways. Merely by way of example, the scanning device 110 may be connected to the processing device 140 through the network 120 or directly. As another example, the storage device 150 may be connected to the processing device 140 through the network 120 or directly.

The scanning device 110 may include a single modality imaging device and/or a multi-modality imaging device, for example, a computed tomography (CT) device, a radiotherapy (RT) device, an image-guided radiotherapy (IGRT), a computed tomography-magnetic resonance imaging (MRI-CT) device, an ultrasound inspection device, an X-ray photography device, etc. For illustration purposes, the CT device may be taken as an exemplary example of the scanning device 110.

The scanning device 110 may include a gantry 111, one or more detectors 112, a detection region 113, a table 114, and a radiation source 115. The gantry 111 may be configured to provide support for other components (e.g., the detector(s) 112 and the radiation source 115, etc.) of the data processing system 100. In some embodiments, the detector(s) 112 and the radiation source 115 may be oppositely mounted on the gantry 111. In some embodiments, the gantry 111 may rotate, for example, clockwise or counterclockwise about an axis of rotation of the gantry 111. The detector(s) 112 and the radiation source 115 may rotate along with the rotation of the gantry 111. The table 114 may be configured to locate and/or support a scanned object. A scanned object may be placed on the table 114 and moved into the detection region 113 (e.g., a space between the detector(s) 112 and the radiation source 115) of the scanning device 110. The radiation source 115 may emit a beam of radiation to the scanned subject. The detector(s) 112 may be configured to detect the radiation beam (e.g., gamma photons) emitted from the detection region 113. The detector(s) 112 may convert the radiation beam passing through the scanned object into the electrical signal, and then convert the electrical signal into digital information by an analog/digital converter. The digital information may be inputted into the processing device for processing, or transmitted to the storage device 150 for storage. In some embodiments, the detector(s) 112 may include one or more detection units. The detector units may include a scintillation detector (e.g., a cesium iodide detector) and/or other detectors. The detector units may be and/or include a single row of detectors and/or multiple rows of detectors.

The network 120 may include any suitable network that can facilitate the exchange of information and/or data for the data processing system 100. In some embodiments, one or more components (e.g., the scanning device 110, the processing device 140, the storage device 150, or the terminal device 130) of the data processing system 100 may communicate information and/or data with one or more other components of the data processing system 100 via the network 120. For example, the processing device 140 may obtain scanning data from the scanning device 110 via the network 120. The network 120 may include a public network (e.g., the Internet), a private network (e.g., a local area network (LAN), a wide area network (WAN), etc.), a wired network (e.g., an Ethernet), a wireless network (e.g., an 802.11 network, a wireless Wi-Fi network, etc.), a cellular network (e.g., a long term evolution (LTE) network), a frame relay network, a virtual private network (VPN), a satellite network, a telephone network, routers, hubs, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the data processing system 100 may be connected to the network 120 to exchange data and/or information.

The terminal device 130 may be connected to and/or communicate with the scanning device 110, the processing device 140, and/or the storage device 150. For example, the terminal device 130 may enable user interactions with the data processing system 100. In some embodiments, the terminal device 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a smart electrical appliance control device, a smart monitoring device, a smart TV, a smart camera, a walkie-talkie, or the like, or any combination thereof. In some embodiments, the wearable device may include bracelets, footwear, glasses, helmets, watches, clothes, backpacks, smart accessories, or the like, or any combination thereof. In some embodiments, the mobile device may include a mobile phone, a personal digital assistant (PDA), a game device, a navigation device, a POS device, a notebook computer, a tablet computer, a desktop computer, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or augmented reality device may include Google Glass™, Oculus Rift™, HoloLens™, Gear VR™, or the like. In some embodiments, the terminal device 130 may be part of the processing device 140.

The processing device 140 may process data and/or information obtained from the scanning device 110, the terminal device 130, and/or the storage device 150. For example, the processing device 140 may determine scanning data sets needed for image reconstruction. In some embodiments, the processing device 140 may be used to process the scanning data sets, for example, data pre-processing, image reconstruction, post-reconstruction processing, etc. In some embodiments, the processing device 140 may be a single server or a group of servers. The server group can be centralized or distributed. In some embodiments, the processing device 140 may be local to or remote from the data processing system 100. For example, the processing device 140 may access information and/or data from the scanning device 110, the storage device 150, and/or the terminal device 130 via the network 120. As another example, the processing device 140 may be directly connected to the scanning device 110, the terminal device 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, and inter-cloud, a multi-cloud, or the like, or a combination thereof. In some embodiments, the processing device 140 may be implemented by a computing device 200 having one or more components as described in connection with FIG. 2.

The storage device 150 may store data (e.g., scanning data of a scanning object), instructions, and/or any other information. In some embodiments, the storage device 150 may store data obtained from the scanning device 110, the terminal device 130, and/or the processing device 140. For example, the storage device 150 may store the scanning data of the scanning object obtained from the scanning device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components (e.g., the processing device 140, the terminal device 130) of the data processing system 100. One or more components of the data processing system 100 may access the data or instructions stored in the storage device 150 via the network 120. In some embodiments, the storage device 150 may be part of the processing device 140, or directly or indirectly connected to the processing device 140.

Figure 2:
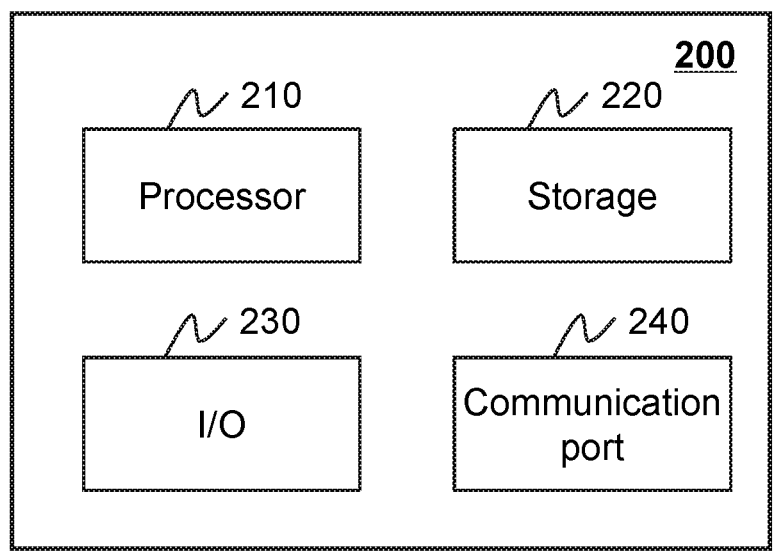
FIG. 2 is a schematic diagram illustrating exemplary hardware components and/or software components of an exemplary computing device according to some embodiments of the present disclosure.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure FIG. 2 is a schematic diagram illustrating exemplary hardware components and/or software components of an exemplary computing device according to some embodiments of the present disclosure. In some embodiments, the processing device 140 may be implemented on the computing device 200. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process scanning data obtained from the scanning device 110, the terminal device 130, the storage device 150, and/or any other component of the data processing system 100. In some embodiments, the processor 210 may include one or more hardware processors, such as a microcontroller, a microprocessor, a reduced instruction set computer (RISC), an application-specific integrated circuit (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, and thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B)

The storage 220 may store data/information obtained from the scanning device 110, the terminal device 130, the storage device 150, and/or any other component of the data processing system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 for reconstructing multiple-phase images of a scanning object based on once retrieved scanning data sets.

The I/O 230 may input and/or output signals, data, information, etc. In some embodiments, the I/O 230 may enable a user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the scanning device 110, the terminal device 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

FIG. 3 is a schematic diagram illustrating exemplary hardware components and/or software components of an exemplary mobile device according to some embodiments of the present disclosure. In some embodiments, one or more components (e.g., the terminal device 130 and/or the processing device 140) of the data processing system 100 may be implemented on the mobile device 300.

As illustrated in FIG. 3, the mobile device 300 may include a display 310, a communication platform 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the data processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

FIG. 4 is a flowchart illustrating an exemplary process for processing scanning data of a scanning object during a scanning process according to some embodiments of the present disclosure. In some embodiments, the process 400 may be implemented in the data processing system 100 illustrated in FIG. 1. For example, the process 400 may be stored in a storage medium (e.g., the storage device 150, or the storage 220 of the processing device 140) as a form of instructions, and can be invoked and/or executed by the processing device 140 (e.g., the processor 210 of the processing device 140, or one or more modules in the processing device 140 illustrated in FIG. 8). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, the processing device 140 (e.g., the acquisition module 810) may determine at least two target phases of a motion of a scanning object. The at least two target phases may be within a scanning process that involves multiple data acquisition time points each of which corresponds to a scanning data set.

As used herein, a target phase corresponds to a certain time period in a motion cycle during which the scanning object is at a specific state (e.g., a gentle state) of a motion of interest. The motion of interest may be a physiological motion including, e.g., a cardiac motion, a respiratory motion, etc. The scanning object may be biological or non-biological. For example, the scanning object may include a patient, an animal (e.g., an experimental mouse), a man-made object, etc. In some embodiments, the scanning object may include a specific portion, organ, and/or tissue of the patient. For example, the scanning object may include the heart, lungs, ribs, the abdominal cavity, the head, the brain, the stomach, the neck, soft tissues, or the like, or any combination thereof, of the patient. For illustration purposes, the heart is taken as an example of the scanning object in the present disclosure. It should be noted that the term "scanning object," "scanned object," "patient," and "heart" are used interchangeably in the present disclosure, in which the magnitude of the cardiac motion is relatively small as compared to the rest of a motion cycle of the cardiac motion.

In some embodiments, the target phase may be represented by a characteristic value between 0 and 1, such as 0.2 or 0.8. The characteristic value may indicate where the target phase is in the motion cycle. In some embodiments, the characteristic value may be a ratio of a characteristic motion magnitude corresponding to the target phase to the maximum magnitude of the motion cycle of the motion of interest of the scanning object. As the target phase corresponds to a first time period, the motion magnitude within the target phase may change over time. The characteristic motion magnitude of the target phase may be an average of the motion magnitude in the target phase, or the motion magnitude at a reference time point of the target phase. For instance, the characteristic motion magnitude of the target phase may be the motion magnitude at the starting time point, the ending time point, the target data acquisition time point, etc., of the target phase.

In some embodiments, the characteristic value may be a ratio of the duration from a reference time point of the motion cycle (e.g., a starting time point of the motion cycle) to a characteristic time point in the target phase to the duration of the motion cycle of the motion of interest of the scanning object. In some embodiments, the characteristic time point in the target phase may be a midpoint, or any other time point (e.g., the starting time point, the ending time point) of the target phase (or the first time period corresponding to the target phase).

It should be understood that a motion cycle as used herein refers to a motion interval or duration in which the scanning object starts to move from an initial state and returns to the initial state after experiencing multiple different states. In some embodiments, in specific motion cycles of the scanning object, the movement of the scanning object may be repeated. That is, the motion intervals/durations of the specific motion cycles may be the same. Accordingly, the characteristic value representing a target phase may indicate where the target phase is in each of one or more motion cycles. A target phase may correspond to a certain motion state of the motion of interest of the scanning object. In some embodiments, in specific motion cycles of the scanning object, the movement of the scanning object may be irregular, instead of regular or cyclic. The motion intervals/durations of at least two consecutive motion cycles of the specific motion cycles may be different.

In some embodiments, information of the at least two target phases may be pre-stored in a storage device (e.g., the storage device 150 or the storage 220). The processing device 140 may identify the at least two target phases based on physiological attributes (e.g., age, gender, etc.) of the scanning object. In some embodiments, the at least two target phases may be identified by a user through one or more terminals (e.g., the terminal device 130). In some embodiments, the at least two target phases may be determined according to practical needs. For example, patients of different ages and/or genders may have different target phases.

In 420, the processing device 140 (e.g., the determination module 820) may identify at least two first time periods during the scanning process. Each of the at least two first time periods may correspond to one of the at least two target phases. In some embodiments, the processing device 140 may identify at least two target data acquisition time points each of which corresponds to one of the at least two target phases during the scanning process.

As used herein, the scanning process refers to a scan of the scanning object. In some embodiments, the scanning process may be performed within one or more motion cycles of the motion of interest. In some embodiments, the processing device 140 may designate one of the one or more motion cycles as a target motion cycle. For example, the processing device 140 may identify the longest motion cycle from the one or more motion cycles, and designate the longest motion cycle as the target motion cycle. Scanning data corresponding to a specific time period within the target motion cycle may be retrieved for image reconstruction. In some embodiments, the processing device 140 may designate at least two of the motion cycles as target motion cycles. For example, assuming that the duration of a motion cycle is T, the duration of the scanning process may be $(\alpha+N) \times T$, in which $\alpha$ is a real number between 0 and 1, and N is zero or a positive integer. In some embodiments, scanning data corresponding to a specific time period within each of the at least two motion cycles may be retrieved for image reconstruction. For example, scanning data corresponding to a time period represented by 0.2 T-0.8 T of each of the at least two motion cycles may be used for reconstructing one or more phase images each of which corresponds to a target phase.

Figure 9A:
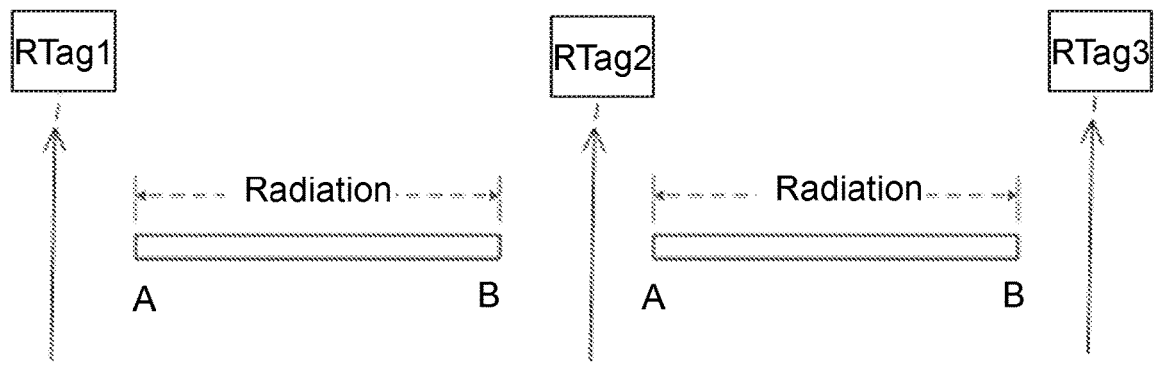
FIG. 9A is a diagram illustrating an exemplary process for acquiring multiple scanning data sets during a scanning process according to some embodiments of the present disclosure.

FIG. 9A is a diagram illustrating an exemplary process for acquiring multiple scanning data sets during a scanning process according to some embodiments of the present disclosure. As illustrated in FIG. 9A, RTag1, RTag2, and RTag3 represent signals of three consecutive heartbeats detected by an electrocardiogram (ECG) monitor. Thus, a duration between each two consecutive heartbeats may be a duration of a motion cycle of the cardiac motion. The radiation source 115 may emit radiation beams at time points within the time period AB of each motion cycle. Scanning data sets each of which corresponds to a data acquisition time point during the time period AB of each motion cycle may be acquired to generate phase images of different phases of the cardiac motion of the heart.

During the scanning process, the radiation source 115 may rotate around the scanning object for scanning. The radiation source 115 may emit a radiation beam at a specific time point based on a scanning protocol, and the detector(s) 112 may detect at least a portion of the radiation beam to obtain scanning data (or scanning data sets). Each time point may be referred to as a data acquisition time point. Since the radiation source 115 is rotating, each data acquisition time point may correspond to a data acquisition angle. As used herein, a data acquisition angle refers to the rotation angle of the radiation source at the corresponding data acquisition time point with respect to a reference direction (e.g., the vertical direction perpendicular to the floor where the scanning device 110 is supported). At the same time, each data acquisition time point may correspond to a set of scanning data (or a scanning data set). That is, the scanning process may involve multiple data acquisition time points each of which corresponds to a scanning data set acquired when the radiation source is at a specific data acquisition angle. It should be noted that the term "scanning data" or "scanning data set(s)" may be used interchangeably in the present disclosure.

In some embodiments, a target phase may correspond to a time period centered on a target data acquisition time point. A data acquisition time point that is the same as or closest, among the plurality of multiple data acquisition time points of the scanning process, to an estimated target data acquisition time point (or referred to as a preset time point) may be designated as the target data acquisition time point corresponding to the target phase. Because the scanning process involves a large number of data acquisition time points within the duration of each motion cycle, a time duration between two adjacent data acquisition time points is short. For example, a motion cycle of the cardiac motion is roughly 0.8 s, and the scanning process performed in one motion cycle of the cardiac motion may have 4200 data acquisition time points. A data acquisition time point during the scanning process that is the same as or the closest, among the plurality of multiple data acquisition time points of the scanning process, to the estimated target data acquisition time point may be designated as the target data acquisition time point corresponding to a target phase. In some embodiments, the processing device 140 may determine the target data acquisition time point corresponding to a target phase based on the starting time point and the ending time point of a motion cycle of a motion of interest of the scanning object in combination with the value representing the target phase. More descriptions regarding the determination of the target data acquisition time point corresponding to a target phase may be found elsewhere in the present disclosure (e.g., FIG. 6 and the descriptions thereof).

In some embodiments, the processing device 140 (e.g., the determination module 820) may determine, based on the target data acquisition time point corresponding to each of the at least two target phases, a first time period corresponding to each of the at least two target phases.

It can be understood that for a target phase, using an image reconstruction algorithm to generate a reconstructed image of the scanning object needs a plurality of scanning data. The first time period may include data acquisition time points corresponding to scanning data sets needed to reconstruct an image (or phase image) of the scanning object of the target phase. An image of a target phase may possess a desired image quality. In some embodiments, the image quality may be assessed in terms of an image resolution with respect to an image resolution threshold, an image contrast with respect to an image contrast threshold, or the like, or a combination thereof.

In some embodiments, the first time period may be a time period including the target data acquisition time point of the target phase. For example, the processing device 140 may select a time period centered on the target data acquisition time point corresponding to the target phase as the first time period. As another example, the processing device 140 may arbitrarily select a time period including the target data acquisition time point of the target phase as the first time period. Correspondingly, the target data acquisition time point corresponding to the target phase may be the midpoint of the first time period, or any time point in the first time period. In some embodiments, the at least two first time periods may fall within a range within the motion cycle of the scanning object. The range may include a portion or all of the motion cycle. More descriptions regarding determining the first time period may be found elsewhere in the present disclosure (e.g., FIG. 5 and the descriptions thereof).

In 430, the processing device 140 (e.g., the determination module 820) may determine a second time period that encloses the at least two first time periods.

In some embodiments, the first time periods corresponding to the at least two target phases may overlap. That is to say, same second scanning data sets corresponding to the overlapping portion of the at least two target phases may need to be involved in the reconstruction of phase images of the scanning object of the at least two target phases. For example, the scanning data set acquired at a certain data acquisition time point can be used to reconstruct two or more phase images each of which corresponds to a target phase. As described elsewhere in the present disclosure, in a single-phase image reconstruction, scanning data acquired in a time period (e.g., the first time period) related to one of the at least two target phases is retrieved and subject to image reconstruction separately for each of the at least two target phases. See, e.g., FIG. 10 and the description thereof. Accordingly, the scanning data corresponding to the overlapping portions of two of the at least two target phases may need to be retrieved and processed (e.g., pre-processed) repeatedly, resulting in duplicated efforts.

According to some embodiments of the present disclosure, the processing device 140 may determine a time period (the second time period) that encloses the at least two first time periods; scanning data corresponding to the at least two first periods may be retrieved and/or (at least partially) processed once to reduce or avoid duplicate efforts in scanning data retrieval and/or processing of same scan data. As used herein, the second time period refers to a time period corresponding to the union or a total of the at least two first time periods or the corresponding target phases. The second time period may include each of the at least two first time periods. As a result, the scanning data sets corresponding to the second time period can be retrieved once for further processing including, e.g., reconstructing phase images corresponding to the target phases or the corresponding first time periods.

In some embodiments, the processing device 140 may determine the second time period based on the starting time point and the ending time point of each of the at least two first time periods. For example, the processing device 140 may designate one of the starting time points of the at least two first time periods as a starting time point of the second time period based on a preset rule. The processing device 140 may designate one of the ending time points of the at least two first time periods as an ending time point of the second time period. More descriptions about the determining the second time period may be found elsewhere in the present disclosure (e.g., FIG. 5 and the descriptions thereof).

In 450, the processing device 140 (e.g., the retrieval module 830) may retrieve once, from the multiple scanning data sets, second scanning data sets for reconstructing phase images of each of which corresponds to one of the at least two target phases. The second scanning data sets may be acquired at second data acquisition time points of the multiple data acquisition time points within the second time period.

In some embodiments, the multiple scanning data sets generates by scanning the scanning object may first be stored in a storage device (e.g., the storage device 150, the storage 220, or an external storage device). In some embodiments, the multiple scanning data sets may be directly transmitted to the processing device 140 and/or the processor 210 for processing. After the second time period is determined, the processing device 140 may retrieval once the second scanning data sets acquired at second data acquisition time points within the second time period from the storage device, or from the received multiple scanning data sets. In this way, the repeated retrieving of the same scanning data may be avoided, and the amount of calculation for subsequent data processing may be reduced, thereby saving data processing time.

In some embodiments, after retrieving the second scanning data sets acquired at each data acquisition time point in the second time period, the processing device 140 may generate a phase image related to each of the at least two target phases based on the acquired second scanning data sets. For example, the processing device 140 may pre-process the second scanning data sets, and perform image reconstruction for each target phase based on the pre-processed second scanning data sets. In some embodiments, algorithms used in the pre-processing may include an air calibration algorithm, an inter-layer normalization algorithm, a crosstalk correction algorithm, a nonlinear correction algorithm, a CT value calibration (HU) algorithm, a bad channel correction algorithm, a beam hardening correction algorithm, or the like, or any combination thereof. More descriptions for generating the reconstructed image of the scanning object may be found elsewhere in the present disclosure (e.g., FIG. 7 and the descriptions thereof).

In the present disclosure, the acquired second scanning data sets only need to be pre-processed once, and then can be used for reconstructing the phase images of the at least two target phases. See, e.g., FIG. 7 and the description thereof. Compared with a single-phase reconstruction that involves repeated retrieving and repeated processing of scanning data, according to some embodiments of the present disclosure, the scanning data to be used in subsequent reconstructing phase images of multiple phases may be retrieved and pre-processed once, thereby avoiding or reducing duplicate efforts and time consumption in retrieving and pre-processing same scanning data sets involved in the reconstruction of multiple phase images corresponding to target phases that partially overlap.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, one or more operations may be omitted and/or one or more additional operations may be added. For example, the process 400 may further include an operation to reconstruct phase images of the scanning object based on the retrieved the second scanning data sets. Additionally or alternatively, the process 400 may further include an operation for transmitting the generated phase images to a terminal device (e.g., the terminal device 130) of a user (e.g., a doctor). The user may view the generated images for further treatment. See, e.g., FIG. 7 and the description thereof.

Figure 5:
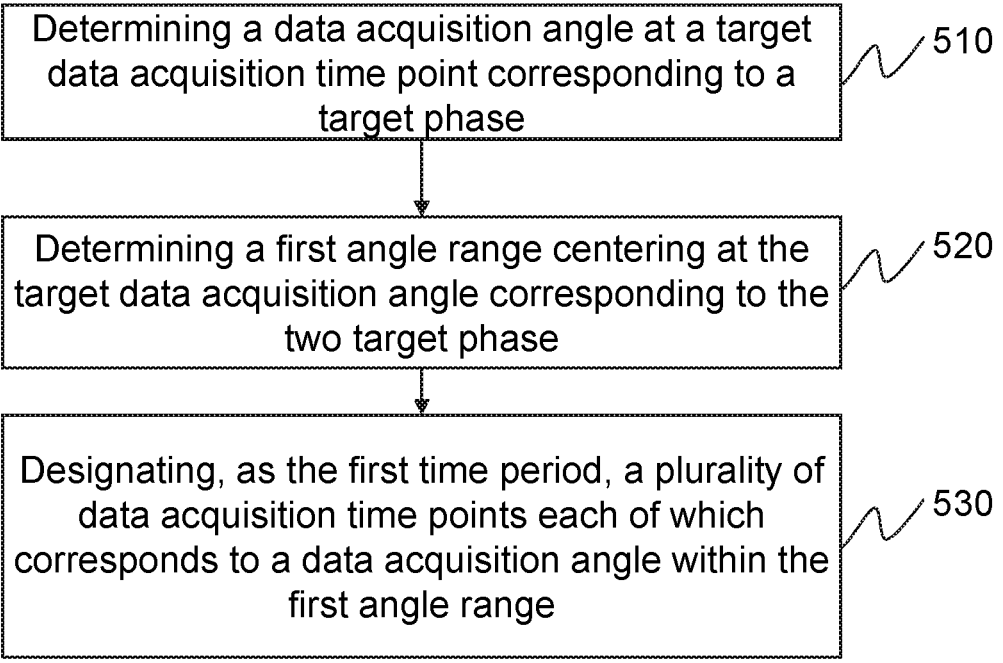
FIG. 5 is a schematic flowchart illustrating an exemplary process for determining a second time period according to some embodiments of the present disclosure.

FIG. 5 is a schematic flowchart illustrating an exemplary process for determining a second time period according to some embodiments of the present disclosure. In some embodiments, the process 500 may be implemented in the data processing system 100 illustrated in FIG. 1. For example, the process 500 may be stored in a storage medium (e.g., the storage device 150, or the storage 220 of the processing device 140) as a form of instructions, and can be invoked and/or executed by the processing device 140 (e.g., the processor 210 of the processing device 140, or one or more modules in the processing device 140 illustrated in FIG. 8). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, operations 420 may be performed based on the process 500.

In 510, the processing device 140 (e.g., the determination module 820) may determine a data acquisition angle at a target data acquisition time point corresponding to a target phase.

In some embodiments, during a scanning process, the radiation source 115 may rotate around the scanning object for scanning. The radiation source 115 may emit a radiation beam at a specific time point (e.g., the target data acquisition time point) based on a scanning protocol, and the detector(s) 112 may detect at least a portion of the radiation beam to obtain scanning data. At least a portion of the detected radiation beam may have passed through the scanning object. Since the radiation source 115 is rotating, each data acquisition time point may correspond to a data acquisition angle (e.g., the rotation angle of the radiation source 115 from a starting data acquisition time point to the data acquisition time point). In some embodiments, the scanning data set corresponding to a data acquisition time point may correspond to a set of acquisition information. The acquisition information corresponding to a scanning data set or its data acquisition time point may include current information of the radiation source 115 (e.g., a tube current of the radiation source 115), a position of the table 114, a tube angle of the radiation source 115 (e.g., the data acquisition angle), a time stamp (e.g., the time stamp of the data acquisition time point), etc., or a combination thereof, when the scanning data set is acquired at the data acquisition time point. The processing device 140 may determine a target data acquisition angle corresponding to a target data acquisition time point corresponding to a target phase by querying the acquisition information. More descriptions about the determining a target data acquisition time point corresponding to a target phase may be found elsewhere in the present disclosure (e.g., FIG. 6, and the descriptions thereof).

In 520, the processing device 140 (e.g., the determination module 820) may determine a first angle range centering at the target data acquisition angle of the target phase.

It should be understood that image reconstruction using an image reconstruction algorithm needs more than one scanning data set acquired at a single data acquisition angle or data acquisition time point. Therefore, in order to perform image reconstruction, multiple scanning data sets may be needed. Therefore, the processing device 140 may obtain, for image reconstruction (i.e., reconstructing a phase image corresponding to the target phase of the scanning object), multiple scanning data sets acquired at data acquisition time points corresponding to the target phase. The scanning data sets may include scanning data acquired at the data acquisition angles within the first angle range. In some embodiments, the first angle range may be determined based on a preset value (e.g., 90°, 180°, 240°, 360°, etc.). In some embodiments, the preset value may be adjusted according to practical needs previously acquired by the processing device 140 or based on a user instruction.

In 530, the processing device 140 (e.g., the determination module 820) may designate, as the first time period, a plurality of data acquisition time points each of which corresponds to a data acquisition angle within the first angle range. For example, the processing device 140 may take the target data acquisition angle corresponding to the target data acquisition time point as the center of the first angle range, take 90° clockwise and 90° anti-clockwise, and determine a time period composed of the data acquisition time points corresponding to all the data acquisition angles within the first angle range, and designate the time period as the first time period.

Figure 9B:
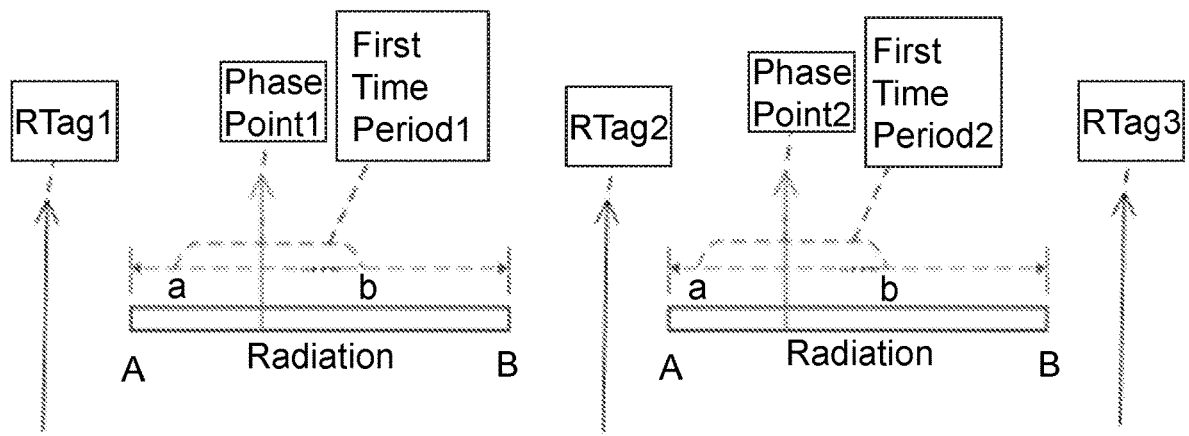
FIG. 9B is a diagram illustrating an exemplary process for determining a first time period according to some embodiments of the present disclosure.

FIG. 9B is a diagram illustrating an exemplary process for determining a first time period according to some embodiments of the present disclosure. As illustrated in FIG. 9B, the radiation source 115 emits radiation beams at time points within the time period AB of each motion cycle. Then, scanning data sets each of which corresponds to a data acquisition time point during the time period AB of each motion cycle are acquired. For a target phase P, a target data acquisition time point (i.e., phase point 1 or phase point 2) corresponding to the target phase P of each motion cycle may be determined according to Equation (1) described in connection with 620. Then a first time period ab (e.g., first time period 1, first time period 2) corresponding to the target phase X is determined by centering on a target data acquisition angle corresponding to the target phase P. The scanning data sets acquired during the first time period ab may be used for reconstructing a phase image of the target phase P.

In some embodiments, the processing device 140 (e.g., the determination module 820) may determine a second time period that encloses the at least two first time periods.

In some embodiments, the processing device 140 may identify a starting time point and an ending time point for each of the two first time periods. For each of the at least two first time periods, the starting time point may be a data acquisition time point corresponding to the smallest data acquisition angle within the first angle range of the first time period; the ending time point may be a data acquisition time point corresponding to the largest data acquisition angle within the first angle range of the first time period. For example, if the target data acquisition angle at the target data acquisition time point corresponding to the target phase is 270°, and the first angle range is 360°, the starting time point of one of the at least two first time periods may be the data acquisition time point corresponding to the data acquisition angle of 90°; the ending time point of the same first time period may be a data acquisition time point corresponding to the data acquisition angle of 450°. In some embodiments, the processing device 140 may determine the starting time point and the ending time point of a first time period by querying the acquisition information. The processing device 140 may designate an earlier starting time point of the at least two starting time points of the at least two first time periods as a starting time point of the second time period. The processing device 140 may designate a later ending time point of the at least two ending time points of the at least two first time periods as an ending time point of the second time period.

Figure 9C:
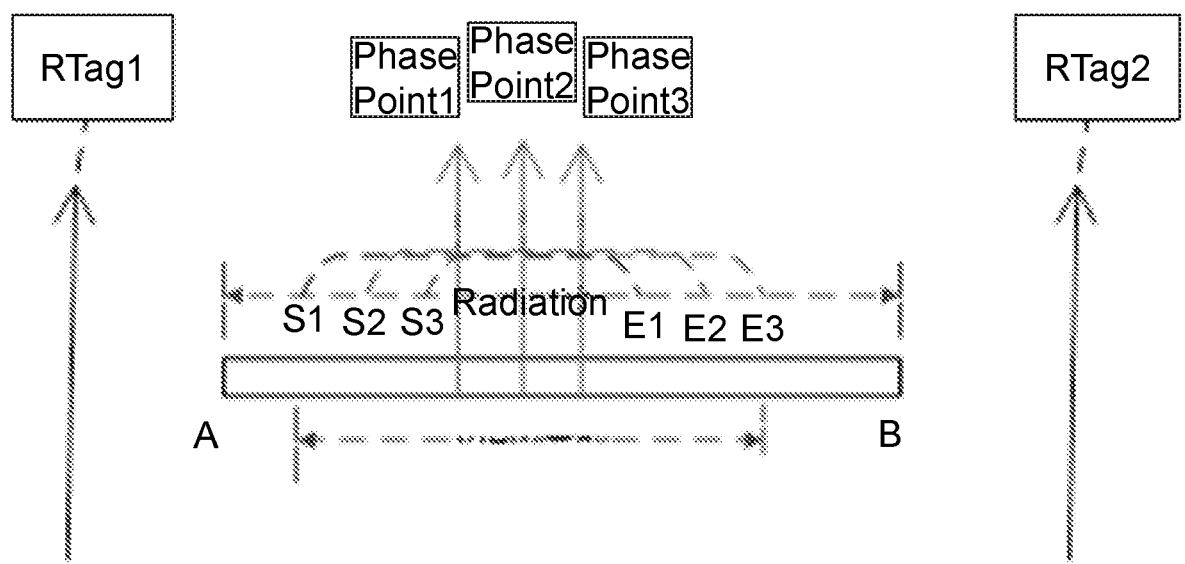
FIG. 9C is a diagram illustrating an exemplary process for determining a second time period during a motion cycle (e.g., [RTag1, RTag2]) of a motion of a scanning object according to some embodiments of the present disclosure.

FIG. 9C is a diagram illustrating an exemplary process for determining a second time period during a motion cycle (e.g., [RTag1, RTag2]) of a motion of a scanning object according to some embodiments of the present disclosure. As illustrated in FIG. 9C, three target phases each of which corresponds a target data acquisition time point (or referred to as "phase point" for brevity) include target phase 1, target phase 2, and target phase 3, and the first time period 1 corresponding to target phase 1 is [S1, E1], where S1 and E1 denote the starting time point and the ending time point of the first time period 1, respectively; the first time period 2 corresponding to target phase 2 is [S2, E2], where S2 and E2 denote the starting time point and the ending time point of the first time period 2, respectively; the first time period 3 corresponding to target phase 3 is [S3, E3], where S3 and E3 denote the starting time point and the ending time point of the first time period 3, respectively. The processing device 140 may determine a minimum starting time point S (e.g., S=min (S1, S2, S3)) (i.e., the earliest starting time point) among the three starting time points (S1, S2, S3). The processing device 140 may determine a maximum ending time point E (e.g., E=max (E1, E2, E3)) (i.e., the latest ending time point) among the three ending time points (E1, E2, E3). The processing device 140 may designate the minimum starting time point S as the starting time point of the second time period and the maximum ending time point E as the ending time point of the second time period. The second time period may be determined as [S, E] (i.e., [S1, E3]). Accordingly, the second time period may enclose the three first time periods. In some embodiments, the processing device 140 may retrieve once scanning data acquired during the second time period. That is, the processing device 140 may retrieve scanning data acquired during the second time periods [S1, E3] of one or more target motion cycles in one data retrieval operation.

It should be noted that when the two first time periods corresponding to the two target phases of the scanning object overlap, and scanning data acquired in each first time period is retrieved and subject to image reconstruction separately for each of the two target phases, the scanning data corresponding to an overlapping portion of the two target phases may need to be retrieved and processed (e.g., pre-processed) repeatedly, resulting in duplicated efforts. As described elsewhere in the present disclosure, by retrieving and/or pre-processing image data corresponding to multiple target phases together, repeated data retrieval and/or pre-processing can be reduced or avoided.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, the process 500 may further include an operation for storing information (e.g., corresponding data acquisition time points in the first time period and/or the second time period). A user (e.g., a doctor) may perform diagnosis and/or treatment based on the generated phase images.

Figure 6:
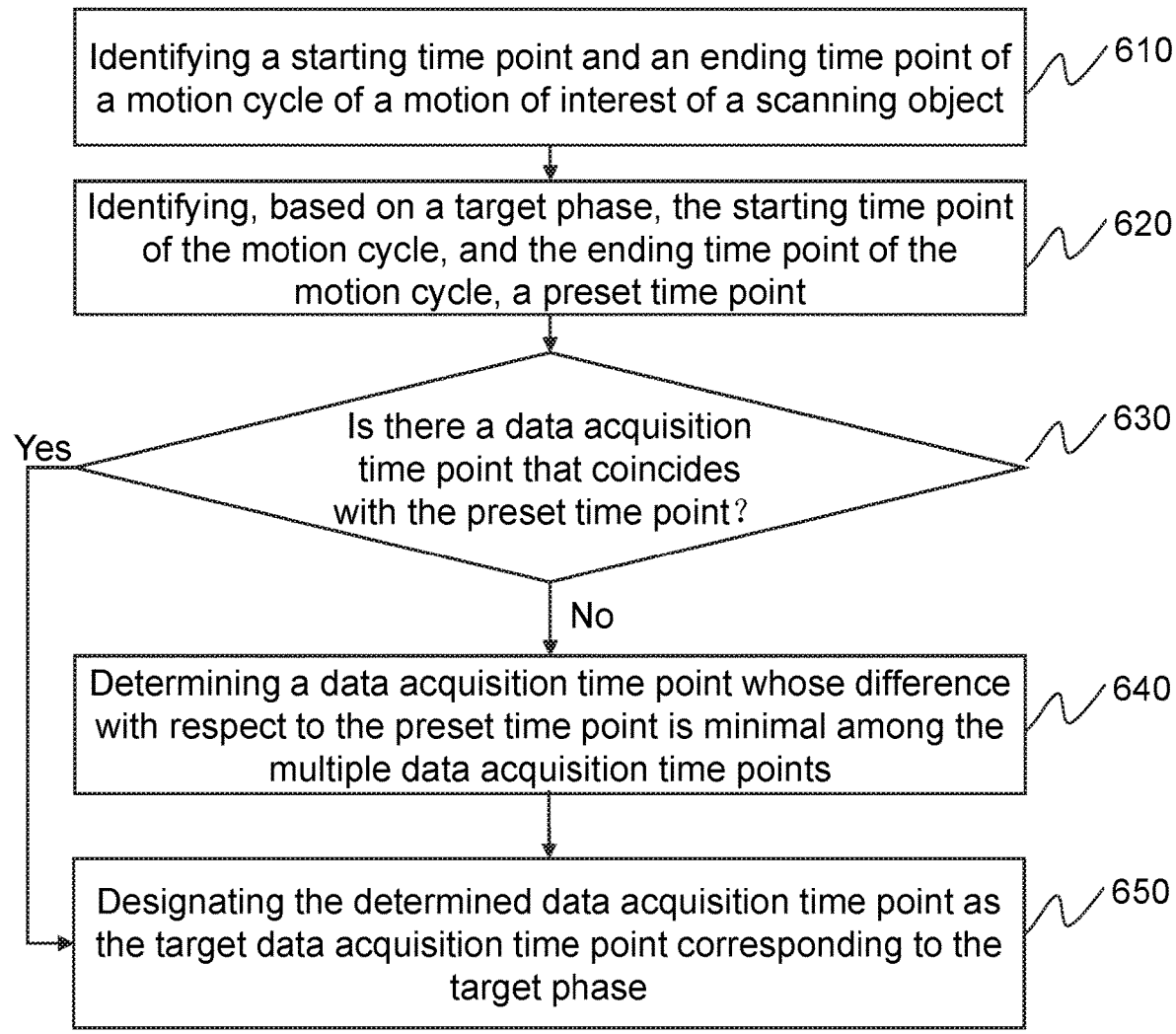
FIG. 6 is a schematic flowchart illustrating an exemplary process for determining a target data acquisition time point corresponding to a target phase associated with a scanning process according to some embodiments of the present disclosure.

FIG. 6 is a schematic flowchart illustrating an exemplary process for determining a target data acquisition time point corresponding to a target phase associated with a scanning process according to some embodiments of the present disclosure. In some embodiments, the process 600 may be implemented in the data processing system 100 illustrated in FIG. 1. For example, the process 600 may be stored in a storage medium (e.g., the storage device 150, or the storage 220 of the processing device 140) as a form of instructions, and can be invoked and/or executed by the processing device 140 (e.g., the processor 210 of the processing device 140, or one or more modules in the processing device 140 illustrated in FIG. 8). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 510 may be performed based on the process 600.

In 610, the processing device 140 (e.g., the determination module 820) may identify a starting time point and an ending time point of a target motion cycle of a motion of interest of a scanning object.

For example, when the scanning object is the heart of a patient, the motion of interest may be cardiac motion, and the target motion cycle may be a time period between two consecutive heartbeats, which may also be referred to as a cardiac cycle. In some embodiments, the target motion cycle may be determined by a monitoring device, such as an electrocardiogram (ECG) monitor. By the ECG monitor, a time period between two consecutive R waves may be identified as a cardiac cycle. At the same time, the monitoring device used to monitor the target motion cycle may record time information related to the target motion cycle, including the starting time point and the ending time point of the target motion cycle. For example, the ECG monitor may record time stamps of the two consecutive R waves in the cardiac cycle. A time stamp of the preceding R wave of the two consecutive R waves may correspond to the beginning of the cardiac cycle, and a time stamp of the next R wave of the two consecutive R waves may correspond to the end of the cardiac cycle. For two consecutive cardiac cycles, the end of the preceding cardiac cycle may coincide with the beginning of the following cardiac cycle. Based on the time information related to the target motion cycle, the processing device 140 may directly determine the starting time point and the ending time point of the cardiac cycle. For example, the monitoring device used to monitor the target motion cycle may send the time information related to the target motion cycle to the processing device 140 through wired or wireless transmission. In some embodiments, the starting time point and the ending time point of the target motion cycle may be represented by the time stamps.

In 620, the processing device 140 (e.g., the determination module 820) may identify, based on a target phase, the starting time point of the target motion cycle, and the ending time point of the target motion cycle, a preset time point (or referred to as estimated target data acquisition time point). The preset time point may correspond to the target phase within the target motion cycle.

In some embodiments, the target phase may be represented by a characteristic value from 0 to 1. More descriptions regarding the characteristic value may be found elsewhere in the present application. See, e.g., 410 in FIG. 4 and the description thereof. The characteristic value representing the target phase may also indicate a state of the motion of interest (e.g., the cardiac motion) of the scanning object at a data acquisition time point corresponding to the target phase in the target motion cycle. For example, if the target motion cycle of the scanning object is T, and the characteristic value used to represent the target phase is 0.4, the scanning object may be in a state corresponding to a time point of 0.4 T from the starting time point of the target motion cycle; the cardiac motion may be in a relatively gentle state at 0.4 T in which the magnitude of the cardiac motion is relatively small as compared to the rest of the target motion cycle of the cardiac motion. In some embodiments, the preset time point may be a specific time point representing the target phase, for example, a specific time point corresponding to 0.4 T from a reference time point of the target motion cycle (e.g., the starting time point of the target motion cycle). Merely by way of example, if T=0.8 s, the scanning object may be in the target phase at the time point (determined based on, e.g., a time stamp) corresponding to 0.32 s from a reference time point of the target motion cycle (e.g., the starting time point of the target motion cycle).

In some embodiments, the processing device 140 may determine the preset time point based on Equation (1):

$$Tpp=T1*(1-p)+T2*p, \quad (1)$$

where T1 denotes the starting time point of the target motion cycle, T2 denotes the ending time point of the target motion cycle, p denotes a characteristic value representing the target phase (0<p<1), and Tpp denotes the preset time point. The processing device 140 may input the starting time point of the target motion cycle, the ending time point of the target motion cycle, and the characteristic value representing the target phase into Equation (1) to determine the preset time point corresponding to the target phase.

In 630, the processing device 140 (e.g., the determination module 820) may determine whether there is a data acquisition time point among multiple data acquisition time points that coincides with the preset time point corresponding to the target phase. The multiple data acquisition time points may be involved in the scanning process of the scanning object, each of which corresponds to a scanning data set.

In some embodiments, the processing device 140 may compare the preset time point with the multiple data acquisition time points, or a portion thereof. In response to determining that there is a data acquisition time point, among the multiple data acquisition time points, that coincides with the preset time point, the processing device 140 may proceed to perform operation 650. In response to determining that there is no data acquisition time point, among the multiple data acquisition time points, that coincides with the preset time point, the processing device 140 may proceed to perform operation 640.

In 640, the processing device 140 (e.g., the determination module 820) may determine a data acquisition time point whose difference with respect to the preset time point is minimal among the multiple data acquisition time points.

When there is no data acquisition time point, among the multiple data acquisition time points, that coincides with the preset time point, a data acquisition time point that is closest to the preset time point, among the multiple data acquisition time points, may be determined. For instance, the processing device 140 may determine the difference between the preset time point and each of the multiple data acquisition time points to determine, based on the differences, the data acquisition time point closest to the preset time point, among the multiple data acquisition time points.

In 650, the processing device 140 (e.g., the determination module 820) may designate the determined data acquisition time point as the target data acquisition time point corresponding to the target phase. The determined data acquisition time point may coincide with the present time point or be closest to the preset time point, among the multiple data acquisition time points.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, the process 600 may further include an operation for storing information and/or data (e.g., the target data acquisition time point corresponding to the target phase) in the storage device 150.

Figure 7:
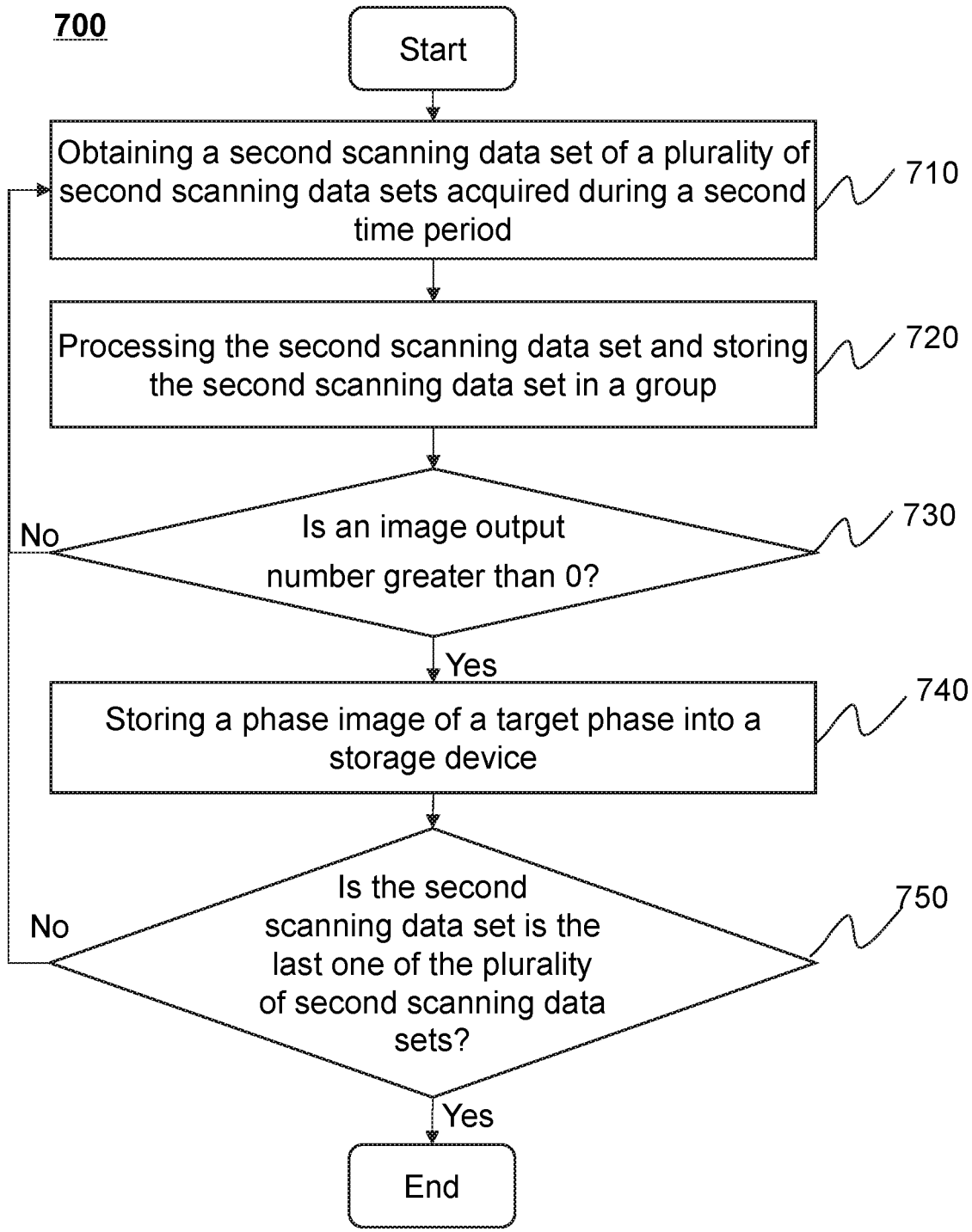
FIG. 7 is a schematic flowchart illustrating an exemplary process for reconstructing multiple-phase images of a scanning object according to some embodiments of the present disclosure.

FIG. 7 is a schematic flowchart illustrating an exemplary process for reconstructing multiple-phase images of a scanning object according to some embodiments of the present disclosure. In some embodiments, the process 700 may be implemented in the data processing system 100 illustrated in FIG. 1. For example, the process 700 may be stored in a storage medium (e.g., the storage device 150, or the storage 220 of the processing device 140) as a form of instructions, and can be invoked and/or executed by the processing device 140 (e.g., the processor 210 of the processing device 140, or one or more modules in the processing device 140 illustrated in FIG. 8). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the processing device 140 (e.g., the reconstruction module 840) may obtain a second scanning data set of a plurality of second scanning data sets acquired during a second time period. The second time period may include at least two first time periods as described in connection with operation 430 in FIG. 4.

It should be noted that when the image reconstruction process starts, the processing device 140 may initialize parameters of one or more algorithms (e.g., a preprocessing algorithm, an image reconstruction algorithm, a post-processing algorithm, etc.) of the image reconstruction process.

In 720, the processing device 140 (e.g., the reconstruction module 840) may process the second scanning data set and store the second scanning data set in a group.

In some embodiments, the processing device 140 may pre-process the second scanning data set. In some embodiments, the processing device 140 may pre-process the second scanning data set using a pre-processing algorithm to make the pre-processed second scanning data sets suitable for subsequent image reconstruction operations. In some embodiments, the pre-processing algorithm may include an air calibration algorithm, an inter-layer normalization algorithm, a crosstalk correction algorithm, a nonlinear correction algorithm, a CT value calibration (HU) algorithm, a bad channel correction algorithm, a beam hardening correction algorithm, or the like, or any combination thereof. In some embodiments, the processing device 140 may further perform a data rearrangement and/or filtering on the second scanning data sets to simplify subsequent image reconstruction process. In some embodiments, the data rearrangement and/or filtering may include using an AziRebin algorithm, a RadialRebin algorithm, a QSRebin algorithm, a filtering algorithm, etc.

In some embodiments, after pre-process the second scanning data set, the processing device 140 may assign the pre-processed second scanning data set into a group corresponding to the first time period of the target phase, and store the group into a first storage device (e.g., the storage device 150). That is, the processing device 140 may identify to which of target phases the data acquisition time point corresponding to the second scanning data set corresponds.

The processing device 140 may identify to which of the target phases the second data acquisition time point corresponds by identifying to which of the first time periods the second data acquisition time point belongs. For example, the processing device 140 may compare the second data acquisition time point with a time range corresponding to each of the first time periods. The processing device 140 may identify to which of the first time periods the second data acquisition time point belongs based on a comparison result. When the processing device 140 determines that the second data acquisition time point belongs to a certain one of the first time periods, the processing device 140 may determine that the second data acquisition time point corresponds to the certain target phase corresponding to the certain first time period. For example, a certain second data acquisition time point 1 is 0.25 T' (from a reference time point, e.g., the starting time point of the target motion cycle), another second data acquisition time point 2 is 0.35 T' (from a reference time point, e.g., the starting time point of the target motion cycle), a time range of the first time period related to a target phase 1 is (0.2 T'-0.4 T'), and a time range of the first time period related to a target phase 2 is (0.3 T'-0.5 T'), where T' denotes a virtual time point (from a reference time point, e.g., the starting time point of the target motion cycle); the processing device 140 may determine that the second data acquisition time point 1 belongs to the time range of the first time period related to the target phase 1 (0.25 T'∈ (0.2 T'-0.4 T')), and the second data acquisition time point 2 belongs to the time range of the first time period related to the target phase 1 (0.35 T'∈ (0.2 T'-0.4 T')) and also the time range of the first time period related to the target phase 2 (0.35 T'(0.3 T'-0.5 T')). Therefore, the processing device 140 may determine that the second data acquisition time point 1 corresponds to the target phase 1, and the second data acquisition time point 2 corresponds to the target phase 1 and also the target phase 2.

In some embodiments, the processing device 140 may sequentially number each data acquisition angle corresponding to each second scanning data set in an ascending order or descending order. Because each data acquisition angle corresponds to one of the second data acquisition time points, each first time period may correspond to a range of the data acquisition angles. The processing device 140 may determine to which data acquisition angle range (or referred to as angle range) the data acquisition angle corresponding to the second data acquisition time point belongs. The processing device 140 may identify to which of the target phases the second data acquisition time point corresponds based on a result of the determination with respect to the angle range. For example, the processing device 140 may index the data acquisition angles corresponding to the plurality of second data acquisition time points in the second time period by, e.g., numbering them according to an ascending order, for example, from 1 to 1200. The processing device 140 may determine the index range of the data acquisition angles for a first time period based on the data acquisition angles corresponding to a starting time point and an ending time point of the first time period. For example, the index of a certain data acquisition angle corresponding to a certain second data acquisition time point is 800, the index range of one of the first time periods related to a target phase 1 is [1-1000], the index range of another one of the first time periods related to another target phase 2 is [601-1500]; the processing device 140 may determine that the certain second data acquisition time point belongs to the first time period related to the target phase 1 (800∈ [1-1000]) and also the first time period related to the target phase 2 (800∈ [601-1500]). Therefore, the processing device 140 may determine that the certain second data acquisition time point corresponds to the target phase 1 and the target phase 2.

In some embodiments, the processing device 140 may determine whether the second scanning data set satisfies a compliance condition, for example, an index of the second scanning data set exceeding an index threshold indicating that there is sufficient scanning data in the group for constructing a phase image. In response to determining that the second scanning data set satisfies the compliance condition, the processing device 140 may proceed to reconstruct a phase image of the corresponding target phase of the scanning object based on the second scanning data sets stored in the corresponding group using an image reconstruction algorithm.

For example, the plurality of second scanning data sets each of which corresponds to an index may be represented by index values 1-1000, where indexes of the second scanning data sets corresponding to one first time period of target phase 1 are 1-600 and indexes of the second scanning data sets corresponding to another one first time period of target phase 2 are 400-1000. The processing device 140 may determine the compliance condition is that the index of a second scanning data set is equal to the maximum index of indexes of a first time period. During an image reconstruction process in which a plurality of second scanning data sets indexed as 1st-1000$^{th}$ second scanning data sets are processed one by one according to an ascending order, i.e., from the 1st to the 1000th second scanning data sets, when the processing device 140 processes the i-th (0<i<1000) second scanning data set, the processing device 140 may determine whether i is equal to 600 or 1000. When it is determined that i is smaller than 600, the processing device 140 may not reconstruct a phase image based on the second scanning data sets 1 to i (i.e., scanning data in a group corresponding to the [1-600], and return to 710 as shown in connection with 730. When it determines that i is equal to or greater than 600, the processing device 140 may reconstruct a phase image based on the second scanning data sets 1 to i in the group.

Moreover, for a second scanning data set that is determined to belong to more than one target phases, e.g., the second scanning data set 600 determined to belong to target phase 1 and target phase 2, the processing device 140 may store such a second scanning data set into groups corresponding to target phases 1 and 2, respectively. The processing device 140 may continue to process the second scanning data sets between 600-1000, and reconstruct a phase image of the target phase 2 until the second scanning data set 800 is processed.

In some embodiments, the image reconstruction algorithm may include an AziRebin algorithm, a RadialRebin algorithm, a QSRebin algorithm, a filtering algorithm, an iterative reconstruction algorithm (e.g., a statistical reconstruction algorithm), a Fourier slice theorem algorithm, a fan beam reconstruction algorithm, an analytical reconstruction algorithm (e.g., a filtered back projection (FBP) algorithm), an algebraic reconstruction technology (ART), a simultaneous algebraic reconstruction technology (SART), a Feldkamp-Davis-Kress (FDK) reconstruction algorithm, or the like, or any combination thereof. In some embodiments, the processing device 140 may post-process the reconstructed phase images using a post-processing algorithm. In some embodiments, the post-processing algorithm may include a Ringoff algorithm, a TV algorithm, an MPR algorithm, or the like, or any combination thereof.

In 730, the processing device 140 (e.g., the reconstruction module 840) may determine whether an image output number is greater than 0; that is, whether a phase image is generated.

In response to determining that the image output number is greater than 0, the processing device 140 may proceed to perform operation 740. In response to determining that the image output number does not greater than 0, the processing device 140 may return to perform operation 710.

In 740, the processing device 140 (e.g., the reconstruction module 840) may store a phase image of a target phase into a second storage device. In some embodiments, the first storage device and the storage device may be the same or different. For example, the first storage device and the second storage device may be integrated into one specific storage device.

In 750, the processing device 140 (e.g., the reconstruction module 840) may determine whether the second scanning data set is the last one of the plurality of second scanning data sets of the second time period.

In response to determining that the second scanning data set is not the last one of the plurality of second scanning data sets, the processing device 140 may proceed to perform operation 710. In response to determining that the second scanning data set is the last one of the plurality of second scanning data sets, the processing device 140 may terminate the image reconstruction process, and output the phase images of the scanning object stored in the second storage device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the processing device 140 may retrieve once, from multiple scanning data sets of a scanning process of the scanning object, the plurality of second scanning data sets for reconstructing the phase images each of which corresponds to a target phase. The processing device 140 may pre-process once the retrieved second scanning data sets. For example, as shown in FIG. 9C, [S1, E3] represents a second time period of a target motion cycle. The processing device 140 may acquire the second scanning data sets for reconstructing the phase images of the scanning object by a single retrieval. That is, the processing device 140 may directly retrieve the second scanning data sets acquired during [S1, E3] of the target motion cycle. It should be noted that the second scanning data sets of each of one or more target motion cycles may be retrieved and/or pre-processed simultaneously or sequentially. For example, the processing device 140 may first retrieve and/or pre-process the second scanning data sets acquired during a second time period of a first target motion cycle, and then retrieve and/or pre-process the second scanning data sets acquired during a second time period of a target second motion cycle. As another example, the processing device 140 may simultaneously retrieve and/or pre-process the second scanning data sets of the one or more target motion cycles. As a further example, the processing device 140 may first retrieve and/or pre-process the second scanning data sets acquired during [S1, S3] of the one or more target motion cycles, then retrieve and/or pre-process the second scanning data sets acquired during [S3, E1] of the one or more target motion cycles, and finally retrieve and/or pre-process the reset second scanning data sets acquired during [E1, E3] of the one or more target motion cycles.

Figure 8:
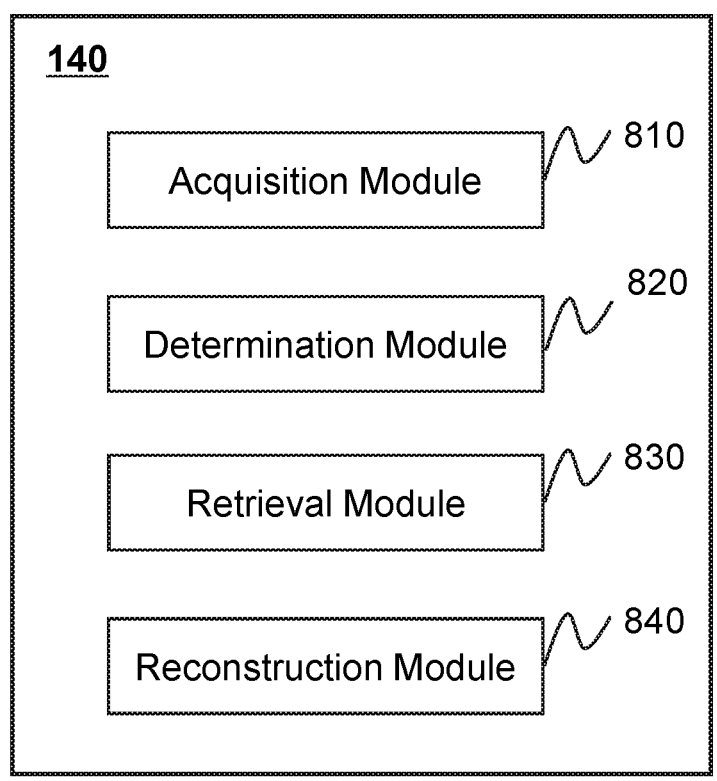
FIG. 8 is a block diagram of an exemplary processing device according to some embodiments of the present disclosure.

FIG. 8 is a block diagram of an exemplary processing device according to some embodiments of the present disclosure. The processing device 140 may determine second scanning data sets corresponding to multiple target phases, and retrieve once the second scanning data sets from multiple scanning data sets acquired during a scanning process. As shown in FIG. 8, the processing device 140 may include an acquisition module 810, a determination module 820, a retrieval module 830, and a reconstruction module 840.

The acquisition module 810 may be configured to obtain information/data associated with image reconstruction of at least two target phases. For example, the acquisition module 810 may obtain the target phases from one or more component of the data processing system 100. As another example, the acquisition module 810 may obtain scanning data acquired during a scanning process.

The determination module 820 may be configured to identify at least two first time periods during the scanning process, each of the at least two first time periods corresponding to one of the at least two target phases. The determination module 820 may further be configured to determine a second time period that encloses the at least two first time periods. In some embodiments, the determination module 820 may identify a starting time point and an ending time point of a target motion cycle of the motion. For each of the at least two target phases, the determination module 820 may identify, based on the target phase, the starting time point of the target motion cycle, and the ending time point of the target motion cycle, a preset time point corresponding to the target phase. The determination module 820 may determine a target data acquisition time point corresponding to the target phase based on the preset time point, and determine, based on the target data acquisition time point, the first period corresponding to the target phase. In some embodiments, the determination module 820 may identify a starting time point and an ending time point for each of the at least two first time periods. The determination module 820 may designate an earlier starting time point of the at least two starting time points of the at least two first time periods as a starting time point of the second time period, and designate a later ending time point of the at least two ending time points of the at least two first time periods as an ending time point of the second time period.

The retrieval module 830 may be configured to retrieve scanning data. In some embodiments, the retrieval module 830 may retrieve once, from the multiple scanning data sets, corresponding scanning data sets for reconstructing phase images each of which corresponds to one target phase.

The reconstruction module 840 may be configured to reconstruct one or more images based on scanning data. In some embodiments, the reconstruction module 840 may pre-process the scanning data, and generate phase images based on the pre-processed scanning data. In some embodiments, for each target phase, the reconstruction module 840 may identify, from the pre-processed scanning data, pre-processed scanning data sets of the target phase. The reconstruction module 840 may reconstruct, based on the pre-processed scanning data sets corresponding to the target phase, a phase image of the target phase. In some embodiments, the reconstruction module 840 may post-process the phase images.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 140 may further include a storage module (not shown in FIG. 8). The storage module may be configured to store data generated during any process performed by any component of in the processing device 140. As another example, each of the components of the processing device 140 may include a storage device. Additionally or alternatively, the components of the processing device 140 may share a common storage device.

FIG. 10 is a flowchart illustrating an exemplary single-phase image reconstruction mode according to some embodiments of the present disclosure. As shown in FIG. 10, the process 1000 (e.g., a process of image reconstruction of CT scan) may include acquiring scanning data 1010, retrieving reconstruction data 1015, pre-processing reconstruction data 1020, reconstructing a phase image 1025, image fusion 1030, post-processing the reconstructed phase image 1035, and storing the post-processed phase image 1040.

The acquiring scanning data 1010 refers to obtaining scanning data from a storage device. The retrieving reconstruction data 1015 may include selecting the reconstruction data for reconstructing an image of a phase based on a target phase, and retrieve the selected scanning data. The pre-processing of reconstruction data 1020 refers to pre-processing the retrieved reconstruction data using a pre-processing algorithm. In some embodiments, the pre-processing algorithm may include an air calibration algorithm, an inter-layer normalization algorithm, a crosstalk correction algorithm, a nonlinear correction algorithm, a CT value calibration (HU) algorithm, a bad channel correction algorithm, a beam hardening correction algorithm, or the like, or any combination thereof. The reconstructing a phase image 1025 refers to generating a phase image of the scanned object based on the pre-processed reconstruction data using an image reconstruction algorithm. In some embodiments, the image reconstruction algorithm may include an AziRebin algorithm, a RadialRebin algorithm, a QSRebin algorithm, a filtering algorithm, an iterative reconstruction algorithm (e.g., a statistical reconstruction algorithm), a Fourier slice theorem algorithm, a fan beam reconstruction algorithm, an analytical reconstruction algorithm (e.g., a filtered back projection (FBP) algorithm), an algebraic reconstruction technology (ART), a simultaneous algebraic reconstruction technology (SART), a Feldkamp-Davis-Kress (FDK) reconstruction algorithm, or the like, or any combination thereof. The image fusion 1030 may include first fusing two sets of sequence images (i.e., the BP(FS)) generated by a full scan algorithm, and then fusing sequence images (i.e., the BP(PS)) generated by the partial scan algorithm and the fused image to generate a reconstructed image. The post-processing the reconstructed image 1035 refers to post-processing the reconstructed image using a post-processing algorithm to improve the quality (e.g., contrast, clarity) of the reconstructed image. In some embodiments, the post-processing algorithm may include a Ringoff algorithm, a TV algorithm, an MPR algorithm, or the like, or any combination thereof. The storing the post-processed phase image 1040 may include transmitting the post-processed reconstructed image to a storage device for storage.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system, comprising:
   at least one storage device storing executable instructions for processing scanning data of a scanning object generated during a scanning process, and
   at least one processor in communication with the at least one storage device, wherein when executing the executable instructions, the at least one processor is configured to cause the system to perform operations including:
      acquiring, in the scanning process, at least two target phases of a motion of the scanning object, wherein the scanning process involves multiple data acquisition time points each of which corresponds to a scanning data set;
      identifying at least two first time periods during the scanning process, each of the at least two first time periods corresponding to one of the two target phases;
      determining a second time period that encloses the at least two first time periods, at least two of the at least two first time periods partially overlapping; and
      retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

2. The system of claim 1, wherein the identifying at least two first time periods includes:
   identifying a starting time point and an ending time point of a motion cycle of the motion;
   for each of the at least two target phases,
      identifying, based on the target phase, the starting time point of the motion cycle, and the ending time point of the motion cycle, a preset time point corresponding to the target phase;
      determining, based on the preset time point, a target data acquisition time point corresponding to the target phase; and
      determining, based on the target data acquisition time point, a first time period corresponding to the target phase, the first time period being one of the at least two first time periods.

3. The system of claim 2, wherein the determining, based on the preset time point, the target data acquisition time point corresponding to the target phase includes:
   determining whether there is a data acquisition time point among the multiple data acquisition time points that coincides with the preset time point corresponding to the target phase;
   in response to determining that there is a data acquisition time point among the multiple data acquisition time points that coincides with the preset time point,
      designating the data acquisition time point as the target data acquisition time point corresponding to the target phase;
   in response to determining that there is no data acquisition time point among the multiple data acquisition time points that coincides with the preset time point,
      determining a difference between the preset time point and each of the multiple data acquisition time points;
      identifying, among the multiple differences, a minimum difference; and
      designating the data acquisition time point corresponding to the minimum difference as the target data acquisition time point corresponding to the target phase.

4. The system of claim 2, wherein the at least two first time periods both fall within a range within the motion cycle.

5. The system of claim 4, wherein the range includes a portion or all of the motion cycle.

6. The system of claim 2, wherein the determining, based on the target data acquisition time point, the first time period corresponding to the target phase includes:
   determining a target data acquisition angle at the target data acquisition time point corresponding to the target phase;
   determining a first angle range centering at the target data acquisition angle corresponding to the target phase; and
   designating, as the first time period, a plurality of data acquisition time points each of which corresponds to a data acquisition angle within the first angle range.

7. The system of claim 1, wherein the determining the second time period that encloses the at least two first time periods includes:
   identifying a starting time point and an ending time point for each of the at least two first time periods;
   designating an earlier starting time point of the at least two starting time points of the at least two first time periods as a starting time point of the second time period; and
   designating a later ending time point of the at least two ending time points of the at least two first time periods as an ending time point of the second time period.

8. The system of claim 1, wherein after retrieving once, from the multiple scanning data sets, the second scanning data sets, the at least one processor is further configured to cause the system to perform operations including:

pre-processing once the second scanning data sets; and
generating, based on the pre-processed second scanning data sets, the phase images.

9. The system of claim 8, wherein the generating, based on the pre-processed second scanning data sets, the phase images includes:
for each of the at least two target phases;
identifying, from the pre-processed second scanning data sets, pre-processed second scanning data sets of the target phase; and
reconstructing, based on the pre-processed second scanning data sets corresponding to the target phase, a phase image of the target phase.

10. The system of claim 9, wherein
each of the pre-processed second scanning data sets of the target phase corresponds to a data acquisition angle, and
the data acquisition angles of the pre-processed second scanning data sets of the target phase are within a first angle range corresponding to the target phase.

11. A method implemented on a computing device including at least one processor and at least one storage medium, and a communication platform connected to a network, the method comprising:
acquiring, in a scanning process, at least two target phases of a motion of a scanning object, wherein the scanning process involves multiple data acquisition time points each of which corresponds to a scanning data set;
identifying at least two first time periods during the scanning process, each of the at least two first time periods corresponding to one of the two target phases;
determining a second time period that encloses the at least two first time periods, at least two of the at least two first time periods partially overlapping; and
retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

12. The method of claim 11, wherein the identifying at least two first time periods includes:
identifying a starting time point and an ending time point of a motion cycle of the motion;
for each of the at least two target phases,
identifying, based on the target phase, the starting time point of the motion cycle, and the ending time point of the motion cycle, a preset time point corresponding to the target phase;
determining, based on the preset time point, a target data acquisition time point corresponding to the target phase; and
determining, based on the target data acquisition time point, a first time period corresponding to the target phase, the first time period being one of the at least two first time periods.

13. The method of claim 12, wherein the determining, based on the preset time point, the target data acquisition time point corresponding to the target phase includes:
determining whether there is a data acquisition time point among the multiple data acquisition time points that coincides with the preset time point corresponding to the target phase;
in response to determining that there is a data acquisition time point among the multiple data acquisition time points that coincides with the preset time point,
designating the data acquisition time point as the target data acquisition time point corresponding to the target phase;
in response to determining that there is no data acquisition time point among the multiple data acquisition time points that coincides with the preset time point,
determining a difference between the preset time point and each of the multiple data acquisition time points;
identifying, among the multiple differences, a minimum difference; and
designating the data acquisition time point corresponding to the minimum difference as the target data acquisition time point corresponding to the target phase.

14. The method of claim 12, wherein the at least two first time periods both fall within a range within the motion cycle.

15. The method of claim 12, wherein the determining, based on the target data acquisition time point, the first time period corresponding to the target phase includes:
determining a target data acquisition angle at the target data acquisition time point corresponding to the target phase;
determining a first angle range centering at the target data acquisition angle corresponding to the target phase; and
designating, as the first time period, a plurality of data acquisition time points each of which corresponds to a data acquisition angle within the first angle range.

16. The method of claim 11, wherein the determining the second time period that encloses the at least two first time periods includes:
identifying a starting time point and an ending time point for each of the at least two first time periods;
designating an earlier starting time point of the at least two starting time points of the at least two first time periods as a starting time point of the second time period; and
designating a later ending time point of the at least two ending time points of the at least two first time periods as an ending time point of the second time period.

17. The method of claim 11, wherein after retrieving once, from the multiple scanning data sets, the second scanning data sets, the at least one processor is further configured to cause the system to perform operations including:
pre-processing once the second scanning data sets; and
generating, based on the pre-processed second scanning data sets, the phase images.

18. The method of claim 17, wherein the generating, based on the pre-processed second scanning data sets, the phase images includes:
for each of the at least two target phases;
identifying, from the pre-processed second scanning data sets, pre-processed second scanning data sets of the target phase; and
reconstructing, based on the pre-processed second scanning data sets corresponding to the target phase, a phase image of the target phase.

19. The method of claim 18, wherein
each of the pre-processed second scanning data sets of the target phase corresponds to a data acquisition angle, and
the data acquisition angles of the pre-processed second scanning data sets of the target phase are within a first angle range corresponding to the target phase.

20. A non-transitory computer readable medium, comprising at least one set of instructions for scanning data processing, wherein when executed by one or more processors of a computing device, the at least one set of instructions causes the computing device to perform a method, the method comprising:
  acquiring, in a scanning process, at least two target phases of a motion of a scanning object, wherein the scanning process involves multiple data acquisition time points each of which corresponds to a scanning data set;
  identifying at least two first time periods during the scanning process, each of the at least two first time periods corresponding to one of the two target phases;
  determining a second time period that encloses the at least two first time periods, at least two of the at least two first time periods partially overlapping; and
  retrieving once, from the multiple scanning data sets, second scanning data sets for reconstructing phase images each of which corresponds to one of the at least two target phases, the second scanning data sets being acquired at second data acquisition time points of the multiple data acquisition time points within the second time period.

* * * * *